United States Patent
Kumar et al.

(10) Patent No.: US 7,372,873 B1
(45) Date of Patent: May 13, 2008

(54) RECONSTRUCTING A PARTIAL TRANSPORT STREAM

(75) Inventors: Nishit Kumar, San Jose, CA (US);
Timothy J. Vogt, Sunnyvale, CA (US);
David R. Auld, San Jose, CA (US)

(73) Assignee: Zoran Corporation, Sunnyvale, CA (US)

( * ) Notice: Subject to any disclaimer, the term of this patent is extended or adjusted under 35 U.S.C. 154(b) by 928 days.

(21) Appl. No.: 10/608,310

(22) Filed: Jun. 27, 2003

(51) Int. Cl.
*H04J 1/00* (2006.01)
*H04J 3/06* (2006.01)
*H04N 5/95* (2006.01)

(52) U.S. Cl. ............... 370/484; 370/486; 370/509; 386/88

(58) Field of Classification Search ........ 370/484–490, 370/497, 509–516; 386/13–20, 85–92, 65
See application file for complete search history.

(56) References Cited

U.S. PATENT DOCUMENTS

| | | | | |
|---|---|---|---|---|
| 5,619,337 | A * | 4/1997 | Naimpally | 386/83 |
| 6,801,544 | B1 * | 10/2004 | Rijckaert et al. | 370/473 |
| 7,006,756 | B1 * | 2/2006 | Keesen et al. | 386/85 |
| 2003/0165196 | A1 * | 9/2003 | Demas et al. | 375/240.25 |
| 2003/0185238 | A1 * | 10/2003 | Strasser et al. | 370/473 |

* cited by examiner

*Primary Examiner*—Chi Pham
*Assistant Examiner*—Tri H. Phan
(74) *Attorney, Agent, or Firm*—Darby & Darby P.C.; John W. Branch

(57) ABSTRACT

A method and a system for reconstructing a partial transport stream are described. One embodiment of the method includes time-stamping each packet when the packet arrives, storing of the selected subset of packets and the associated timestamps in a storage medium, reading the stored packets and their timestamps from the storage medium, and reconstructing the partial transport stream with the packets and their timestamps.

38 Claims, 10 Drawing Sheets

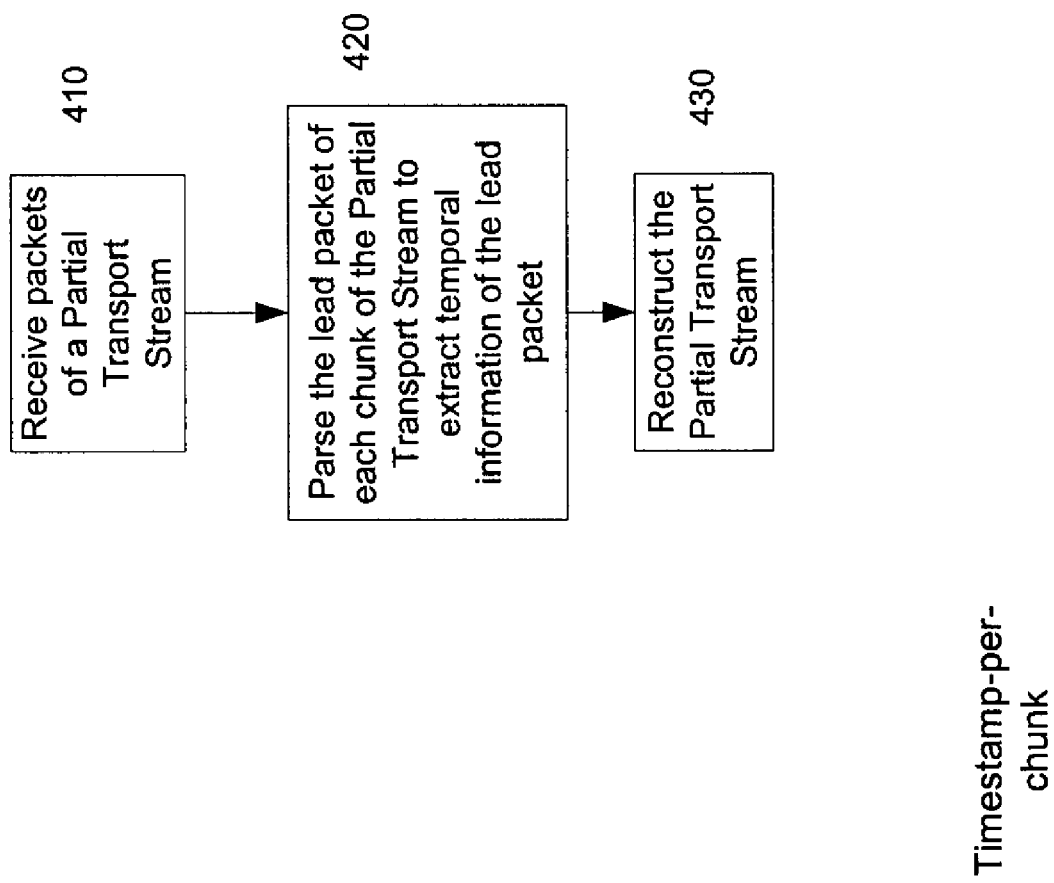

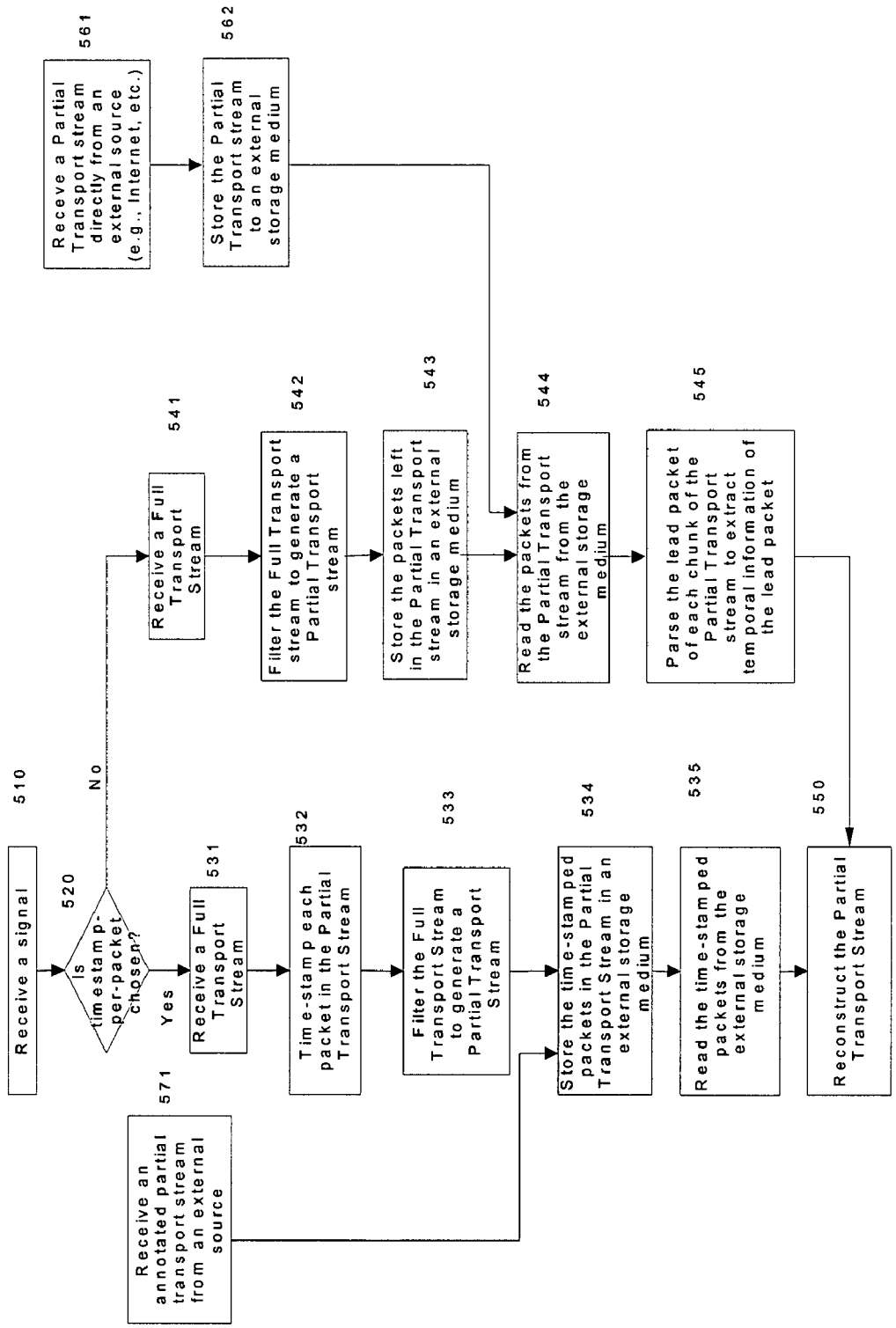

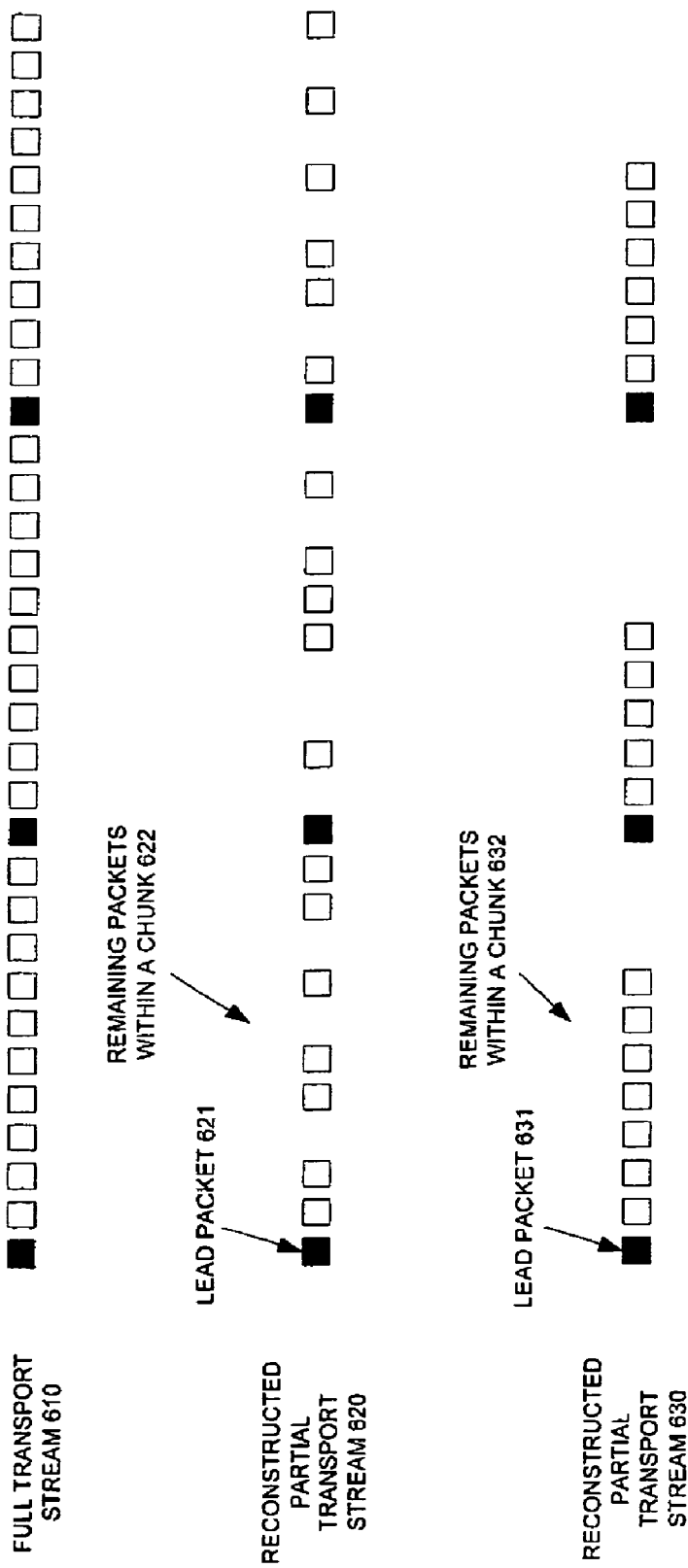

RECONSTRUCTING A PARTIAL TRANSPORT STREAM

FIELD OF INVENTION

The present invention relates to digital video processing, and more particularly, to reconstructing a partial transport stream in a digital television system.

BACKGROUND

Digital video is being used in an increasing array of applications ranging from personal computers (PC) and video conferencing to digital televisions (TV), set-top boxes, and personal video recorders (PVR). These varied video systems can process content from cable, satellite, and terrestrial broadcasts as well as streaming video and video-on-demand over the internet. The digital television industry faces several challenges in order to accelerate worldwide deployment of these technologies. It needs to make TV compelling and engaging, lower the cost of the roll-out of interactive services on digital TV, and develop a whole range of products in cost effective ways to take advantage of new market opportunities.

In particular, the fast-growing PVR systems (also known as Digital Video Recorders DVR) allow consumers to interactively choose which content they want to watch, from broadcast media or video-on-demand, and when to watch it. The viewers have the control, management rights, and personalization options on digital content. For example, the PVR/DVR systems allow viewers to record TV broadcasts from cable, satellite, or over-the-air to a hard disk. These systems record automatically, allowing viewers to pause, rewind, and replay live television. Furthermore, the PVR/DVR systems allow easy management of pre-recorded programs, and the ability to schedule and specify the recordings.

An important component of a PVR/DVR system is the storage medium. Traditionally, hard disks have been used as the storage medium. Newer systems have also employed conventional VHS tapes to record digital content in a compressed format, for example, the Digital VHS (D-VHS) format. These systems interface with digital video processing integrated circuits (ICs) using the IEEE 1394 digital interface. The format of digital content stored can range from full transport streams to partial transport streams and program streams.

Full transport streams contain fixed-size packets from several different compressed programs interleaved together. For example, broadcast signals use full transport streams. These carry not only the content information within the packets, but also the temporal information, which is important for maintaining precise display rates in a television receiver. On the other hand partial transport streams contain only a selected subset of packets, usually filtered based on the packet identifier (PID). From a storage perspective, systems based on partial transport streams are superior to the ones based on full transport. Program streams, used ubiquitously in DVDs, are non-packetized streams of data usually containing only a single compressed program. Systems based on program streams require additional control information to be stored, since the stored content has only limited temporal information Since content in a transport-stream based PVR/DVR system could originate from a storage medium (and not a broadcast signal), an important problem is reconstructing the stream precisely. All temporal information must be recreated. For full transport streams, a hardware module can read data from the storage medium at a fixed, known rate and recreate the temporal information. However, the problem is more challenging for partial transport streams. Proper gaps for packets that were dropped due to PID filtering have to be recreated. The transport stream reconstruction problem also arises when a partial transport stream has to be recorded on an ISO-61883 compliant storage medium connected via IEEE 1394 interface. For example, the input to a D-VHS tape must be a partial transport stream with very low jitter so that the content can be played back to the digital TV system as precisely as a broadcast signal.

SUMMARY OF INVENTION

A method and a system for reconstructing partial transport streams are described. One embodiment of the method includes time-stamping each packet when the packet arrives, storing the selected subset of packets and the associated timestamps in a storage medium, reading at playback time the stored packets and their timestamps from the storage medium, and reconstructing the partial transport stream.

BRIEF DESCRIPTION OF THE DRAWINGS

The present invention will be understood more fully from the detailed description that follows and from the accompanying drawings, which however, should not be taken to limit the appended claims to the specific embodiments shown, but are for explanation and understanding only.

FIG. 4 shows a flow diagram of an embodiment of a process for timestamp-per-chunk.

FIG. 5 shows a flow diagram of an embodiment of dynamically selecting timestamp-per-packet or timestamp-per-chunk.

FIG. 6A shows sample partial transport streams.

DETAILED DESCRIPTION

Figure 1:
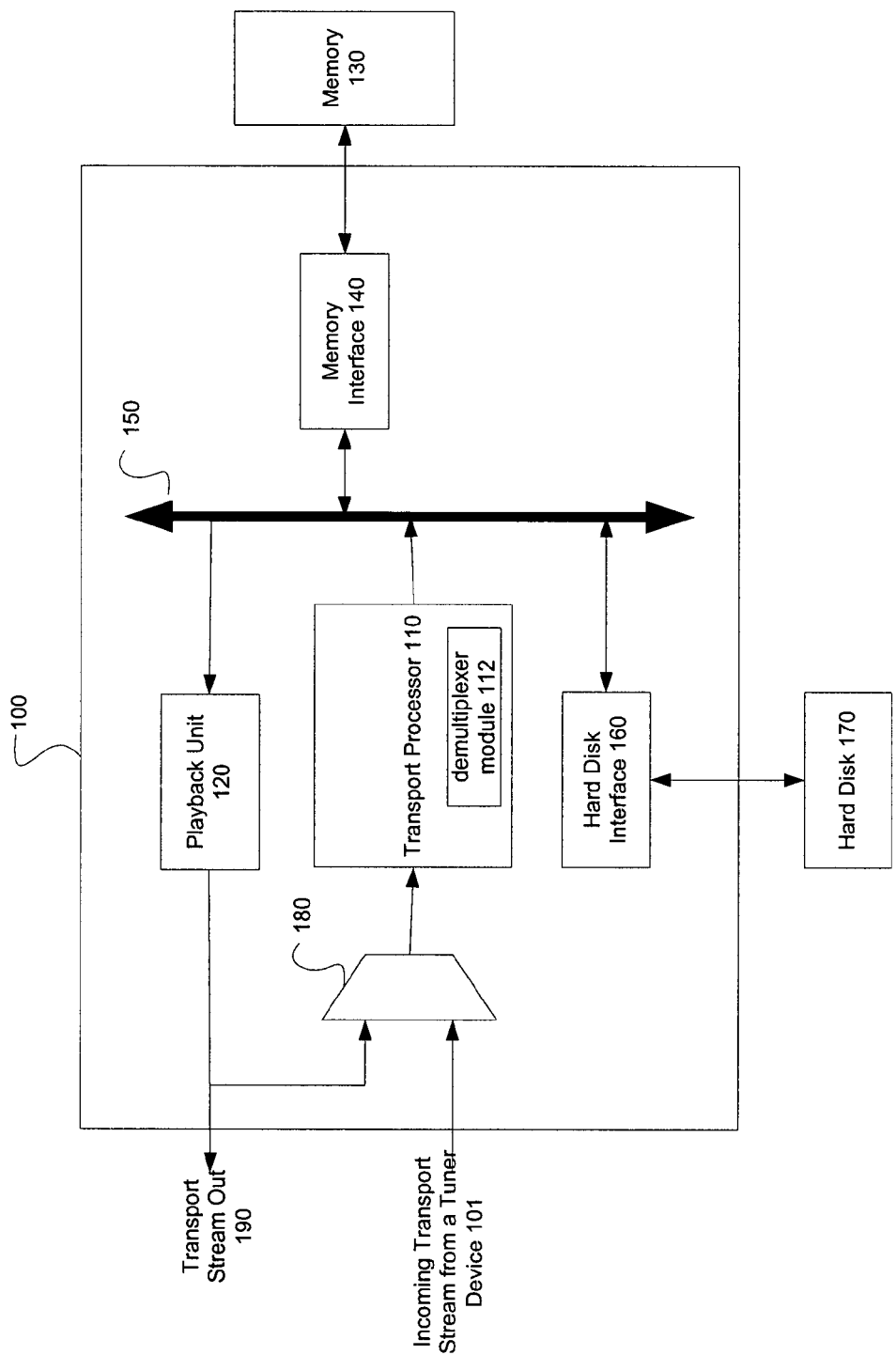
FIG. 1 shows an exemplary embodiment of a hardware unit within a DVR/PVR system.

A method and a system for reconstructing partial transport streams are described. One embodiment of the method includes time-stamping each packet when the packet arrives, storing the selected subset of packets and the associated timestamps in an external storage medium, reading at playback time the stored packets and their timestamps from the external storage medium, and reconstructing the partial transport stream. In another embodiment, the method includes receiving a partial transport stream in such a way that there may or may not be an opportunity for time-stamping each packet. The method involves breaking down the partial transport stream into chunks of several packets, parsing the lead packet of each chunk to extract temporal information of the lead packet, and reconstructing the partial transport stream with piece-wise temporal accuracy.

In the following description, numerous specific details are set forth. However, it is understood that embodiments of the invention may be practiced without these specific details. In other instances, well-known components, structures, and techniques have not been shown in detail in order not to obscure the understanding of this description.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

FIG. 1 is a block diagram of an exemplary embodiment of a DVR/PVR system. Only those portions relevant to the understanding of the present invention have been illustrated. Referring to FIG. 1, the hardware unit 100 is coupled to both the memory 130 and the hard disk 170. Television broadcast data is delivered into the hardware unit 100 as a digital transport stream 101, e.g., MPEG transport stream. In one embodiment, the data is delivered into the hardware unit 100 by a tuner device. In one embodiment, the hardware unit 100 includes a transport processor 110, a playback unit 120, a hard disk interface 160, an internal memory bus 150, a memory interface 140, and a multiplexer 180. The output of the multiplexer 180 is forwarded to the transport processor 110. The transport processor 110 is further coupled to the internal memory bus 150. The hard disk interface 160 couples the hard disk 170 to the internal memory bus 150. The memory interface 140 couples the memory 130 to the internal memory bus 150. The playback unit 120 receives input from the internal memory bus 150 and generates an output transport stream 190. The transport stream 190 can be routed out of the hardware unit 100 to a digital recorder (not shown) through the transport stream out 190 interface. In one embodiment, it can also be routed to the transport processor 110 through the multiplexer 180 to provide descrambling and demultiplexing functions. As will be explained later, the transport processor 110, at any given time, can either process the incoming transport stream from an external tuner device 101, or the transport stream 190 generated by the playback unit 120, or both the streams simultaneously.

The transport processor 110 provides descrambling and demultiplexing functions on the incoming transport stream 101 or one generated by the playback unit 120 (that is, transport stream 190). In one embodiment, the demultiplexed output of the transport processor 110 is written into several different memory buffers via the internal memory bus 150. A transport stream contains fixed size packets from several different programs interleaved together. For example, a packet is 188-bytes for MPEG transmissions, and the packet is 130 bytes for DirecTV® transmissions. A typical transport stream interface consists of 1-bit (serial) or 8-bit (parallel) data together with a transport clock, a valid signal (denoting if a bit or byte of data is valid), and a frame signal (denoting the beginning of a packet). A transport stream may contain packets for a number of audio, video, and auxiliary channels. Each packet may be denoted by the packet identifier (PID) or service channel identifier (SCID).

In one embodiment, the transport processor 110 includes a demultiplexer module 112, which is capable of parsing transport packets and binning their contents into separate memory buffers based on their PID/SCID values. The demultiplexer module 112 also provides a number of application specific functionalities, such as Program Specific Information (PSI) filtering, private data capture, etc. To deal with multiple standards (e.g., MPEG, DirecTV, ATSC, ARIB, etc.) and evolving application-specific features, in one embodiment, the demultiplexer module 112 includes a general-purpose programmable micro-controller.

The playback unit 120 reads transport data from the memory 130 and produces a transport stream 190. In one embodiment, the transport stream 190 is produced at a user-defined rate. The transport data stored in the memory 130 may be full transport stream (i.e., contains every packet transmitted by the broadcaster), or it may be partial transport stream (i.e., contains only a subset of packets). For the latter case, it is often necessary to recreate a transport stream with gaps corresponding to the packets dropped due to PID filtering.

FIG. 1 also shows a memory interface module 140, interfacing with the memory 130. In one embodiment, the memory 130 is a temporary scratch-pad memory. The memory 130 may include a Double Data Rate memory (DDR). In an alternate embodiment, the memory 130 includes a Synchronous Dynamic Random Access Memory (SDRAM) module. In one embodiment, intermediate data generated between receiving a transport stream and displaying a program video and playing the corresponding audio is stored in the memory 130. Inside the hardware unit 100, the memory interface module 140 communicates through an internal memory bus 150 with processing units that need intermediate storage. Furthermore, in one embodiment, the hardware unit 100 includes a hard disk interface unit 160 that can either read data from or write data to the hard disk 170. The hard disk 170 is used for long-term storage of data, such as, for example, minutes or hours, unlike the memory 130, which stores data for seconds.

In alternate embodiments of a DVR/PVR system, the recording device may be a digital VCR instead of a hard disk or it may be an external decoder device connected to the hardware unit through the transport stream out interface 190.

In order to view a selected program from a transport stream, the hardware unit 100 has to first demultiplex the stream in order to sort out the relevant packets. Typically, the selected program includes packets corresponding to a video PID and to audio PIDs. The demultiplexed data is then decompressed (e.g., MPEG decompression) and converted to a suitable display format for video and to a suitable audio format for sound. In one embodiment, the digital video and audio decoders (for decompression) and the audio/video rendering modules are integrated on a single system-on-a-chip along with the transport processing modules. The hardware unit 100 can process transport streams by running various applications, such as, "WATCH-A-PROGRAM" and "RECORD-AND-WATCH."

The "WATCH-A-PROGRAM" application goes through the following operations: the incoming transport stream is forwarded to the demultiplexer 112 to demultiplex the programs; the demultiplexed programs are stored on the memory 130; and the stored programs are retrieved and decompressed for display and sound.

In contrast to the "WATCH-A-PROGRAM" application, a more sophisticated "RECORD-AND-WATCH" or "WATCH-DELAYED-BROADCAST" application in a PVR system works through the following operations: the incoming transport stream 101 is forwarded to the demultiplexer 112 inside the transport processor 110 to be transformed into annotated partial transport data, which is stored in the memory 130; the stored partial transport data can be forwarded to the hard disk 170 for long term storage through the hard-disk interface 160; at the time of playback, data from the hard-disk 170 is moved to the memory 130; to play back the stored data, the playback unit 120 reads the data from the memory 130 and reconstructs a temporally accurate partial transport stream 190 out of the data; the partial transport stream is demultiplexed by 112 and decompressed for audio and video rendering. The transport processor 110 provides demultiplexing functions on a transport stream from a tuner device 101 or a transport stream from the playback unit 120, as selected by a multiplexer 180. In one embodiment, both the streams can also be demultiplexed simultaneously.

In the "RECORD-AND-WATCH" or "WATCH-DELAYED-BROADCAST" application the transport processor 110 processes the same transport stream two times. While the live broadcast is being transformed into annotated partial transport data (by the demultiplexer module 112 in the transport processor 110) and being stored on the hard disk 170, a broadcast recorded sometime earlier can be demultiplexed (by the same demultiplexer module 112 in the transport processor 110), decompressed, and displayed for viewing. The two broadcasts may be the same program, temporally different. As explained later, the annotation along with the partial transport data is used by the playback unit 120 to generate precise partial transport streams using the timestamp-per-packet method, which is discussed in detail in a later section. One reason for writing partial transport data instead of full transport data on a long-term storage medium is to save storage space. A stream transmitted by the broadcaster may contain many more programs than what a viewer may be interested in.

The Reasons for Precise Reconstruction of Partial Transport Streams

In a broadcast video system, the video being decompressed and displayed on the receiver side (or the decoder) has to be received and processed at the same rate as on the broadcast side (or the encoder). In one embodiment, rate synchronization is attained by the use of encoder-side timestamps that are transmitted in a transport stream as a special clock-reference packet. For example, the Program Clock Reference (PCR) packet in MPEG contains a 42-bit counter based on a 27 MHz reference clock in the encoder. In MPEG transmissions, PCR packets arrive no more than 100 milliseconds apart.

Figure 2:
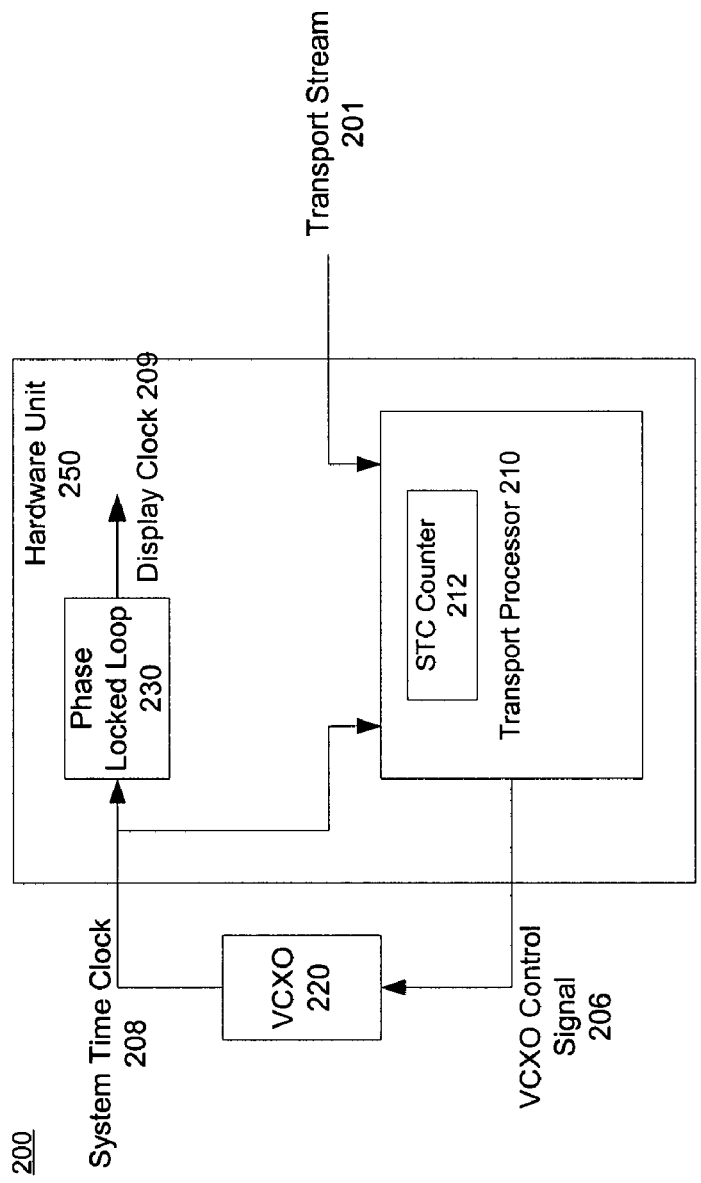
FIG. 2 shows an embodiment of an encoder/decoder rate synchronizer loop.

On the decoder side, one embodiment of a basic synchronization system includes a first order feedback loop. FIG. 2 shows an embodiment of an encoder/decoder rate synchronization loop 200, which includes a transport processor 210, a voltage controlled oscillator (VCXO) 220, and a phase locked loop (PLL) 230. The PLL 230 and the transport processor 210 are integrated into a hardware unit 250. The transport processor 210 includes a counter 212 based on a system time clock (STC) 208.

The transport processor 210 receives a transport stream 201 including a number of PCR packets. The arrival-time of each PCR packet is recorded with the value of the STC counter 212 at that time. In one embodiment, the STC counter 212 is based on a 27 MHz reference clock local to the receiver. Each incoming PCR value is subtracted from the decoder's corresponding STC counter value, and the product of the filtered difference multiplied by a proportionality constant is the VCXO control signal 206 for the VCXO 220. The VCXO 220 supplies the system time clock signal 208 to the PLL 230. This feedback loop stabilizes with the correct frequency, ensuring a lock between the encoder and the decoder reference clocks. One output of the PLL 230 is the display clock 209 that is supplied to the display rendering module. In one embodiment of the hardware unit 250, other clocks are also generated (e.g., one or more memory interface clocks, a clock for the integrated central processing unit (CPU), audio clock, and core clock). In this embodiment, a microprocessor, digital decoder modules, audio modules, graphics and video processing modules, and display modules are integrated together along with the memory interface 140, the hard-disk interface 160, the transport processor 110, and the playback unit 120. The display and audio clocks have to track the variations in the STC 208 in order to maintain precise display and audio rendering rates, that is, without skipped or repeated frames. Other clocks in the system, such as the memory interface clocks, need not track the STC 208.

In some DVR/PVR systems, the transport stream being viewed may come from a storage device. The system therefore recreates the relative timing of packets, especially that of the PCR packets. If the storage medium contains the full transport stream, the playback unit 120 can read out transport data at a fixed constant rate matching that of the broadcast. However, for partial transport, appropriate time gaps have to be inserted into the reconstructed partial transport stream for the missing packets. Most significantly, PCR packets within the transport stream produced by the playback unit 120 require precise relative timing to allow proper clock recovery by the decoder. The MPEG standard (ISO/IEC 13818-1) specifies strict requirements for PCR packet timing (maximum +/−500 ns of jitter). Precise packet timing is also important for maintaining adherence to the MPEG buffer model to prevent buffer overflow or underflow in the decoder.

Exemplary Embodiments of Reconstructing Partial Transport Streams

Figure 3A:
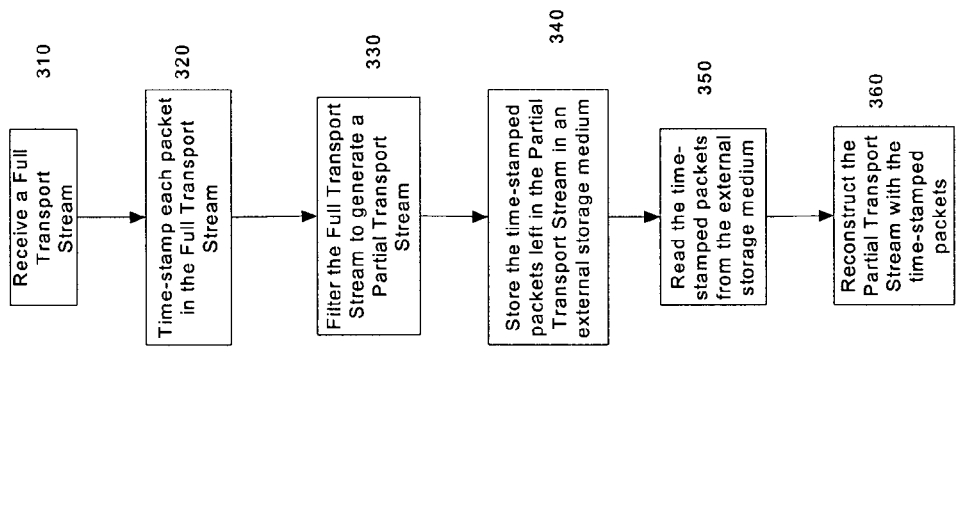
FIG. 3A shows a flow diagram of an embodiment of a process for timestamp-per-packet.

The first embodiment is hereinafter referred to as timestamp-per-packet. FIG. 3A shows a flow diagram of an embodiment of a process for timestamp-per-packet. The process is implemented with processing logic that may comprise hardware (e.g., circuitry, dedicated logic, etc.), software (such as is run on a general purpose computer system or a dedicated machine), or a combination of both. Referring to FIG. 3A, processing logic receives a full transport stream, which has a number of packets (processing block 310). Processing logic then time-stamps each packet. In one embodiment, processing logic records the STC counter value for every packet on its arrival (processing block 320). Processing logic then filters the full transport stream to generate a partial transport stream having fewer packets than the full transport stream (processing block 330). In one embodiment, a PID filter unit drops unwanted packets from the full transport stream. If a packet is not dropped during filtering, the STC counter value is written together with the packet itself on an external storage medium (processing block 340). Whenever content stored on the external storage is required to be played back, the playback unit uses the timestamps of the packets to recreate the partial transport stream precisely.

Figure 3B:
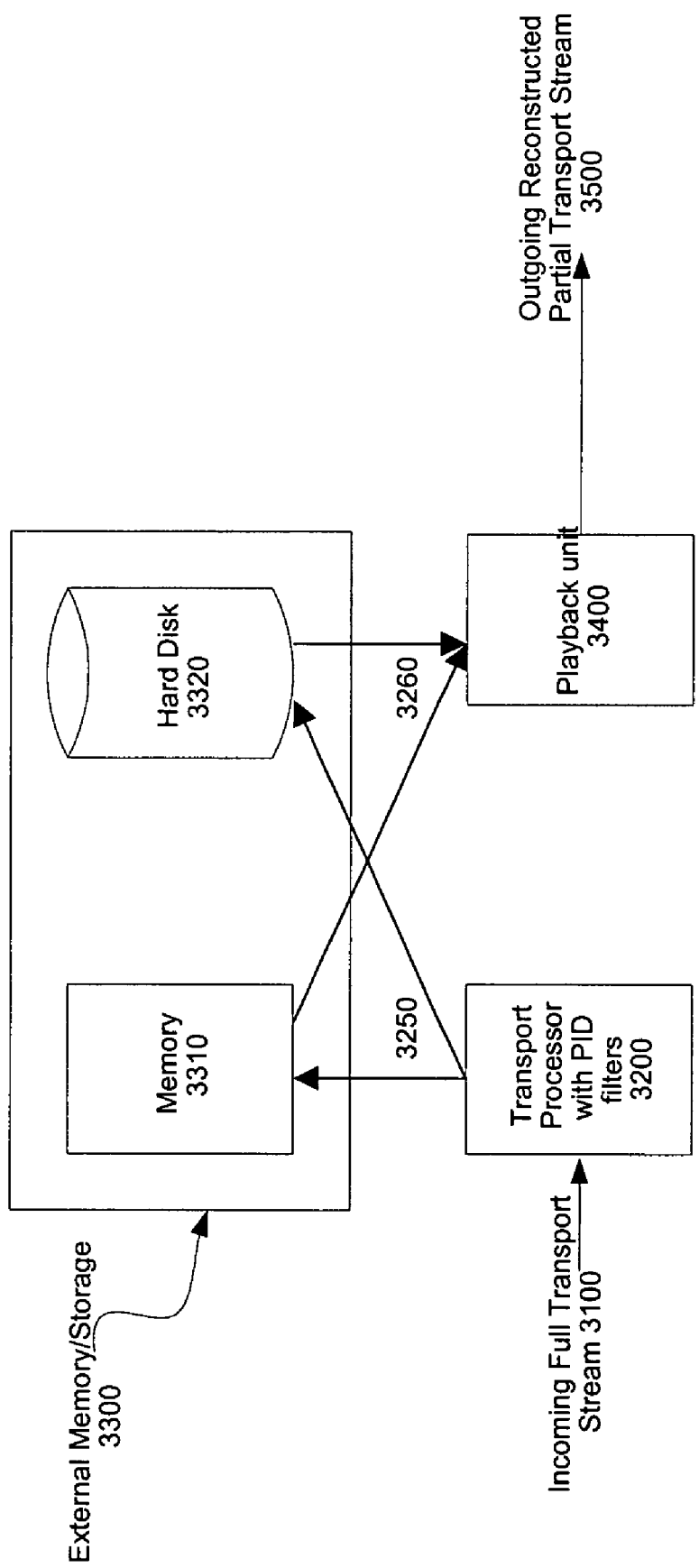
FIG. 3B shows the logical interconnection of components in one embodiment of timestamp-per-packet.

FIG. 3B shows the logical interconnection of components in one embodiment of a process for timestamp-per-packet. The incoming full transport stream 3100 is forwarded to a transport processor with PID filters 3200. The transport processor 3200 timestamps all packets in the incoming full transport stream 3100. The PID filter then drops unwanted packets from the full transport stream to generate a partial transport stream 3250. In one embodiment, the packets in the partial transport stream 3250 are stored in an external memory/storage 3300. The external memory/storage 3300 is an arbitrarily large memory. In one embodiment, the external memory/storage 3300 includes a memory 3310. In one embodiment, the memory 3310 includes a DDR. In another embodiment, the memory 3310 includes a SDRAM. In another embodiment, the external memory/storage 3300 includes a hard disk 3320. In another embodiment, the external memory/storage 3300 includes both a memory 3310 and a hard disk 3320. The external memory/storage 3300 is extendable with long-term storage device, such as a hard disk. The embodiment in FIG. 1 may be implemented by using a hard-disk interface 160 coupled via the internal memory bus 150 to the memory 130 via the memory interface 140, wherein the memory 130 includes a DDR.

The playback unit 3400 retrieves the stored packets with their timestamps 3260 from the external memory/storage 3300 and reconstructs the partial transport stream with precise temporal accuracy. Then the playback unit 3400 outputs the reconstructed partial transport stream 3500.

Although in one embodiment, the reconstruction of a partial transport stream is lossless and preserves all the temporal information, it comes at the expense of storage overhead. For the case of MPEG, as an example, each 188-byte packet requires an additional 42 bits at a minimum for the STC counter value, implying about 3% of additional overhead. This embodiment is not applicable when the partial transport data does not contain timestamp information, such as, for example, if a pre-recorded program is sent to the hardware unit over a non-realtime auxiliary channel such as an Internet connection. In this case, there is no opportunity to record the arrival time of the packets.

To address the above issues, in another embodiment, the reconstruction of a partial transport stream is performed by re-creating the precise arrival times for the lead packets only, instead of every packet. This technique is referred to as timestamp-per-chunk. FIG. 4 shows a flow diagram of one embodiment of a process for reconstructing a partial transport stream using timestamp-per-chunk. The process is performed with processing logic that may comprise hardware (e.g., circuitry, dedicated logic, etc.), software (such as is run on a general purpose computer system or a dedicated machine), or a combination of both. Referring to FIG. 4, processing logic receives a partial transport stream (processing block 410) from either a broadcast medium (e.g., the incoming transport stream from a tuner 101 in FIG. 1), a pre-recorded program from an IEEE 1394 device (connected on a transport-input interface, similar to the tuner), a video-on-demand stream over a Serial Peripheral Interface (SPI) interface (integrated within an embodiment of digital TV system-on-a-chip), a stream received across a Peripheral Component Interconnect (PCI) interface from an external storage/transmission device or another source. In one embodiment, the PCI interface is integrated within a digital TV system-on-a-chip.

The partial transport data is divided into a number of chunks. Each chunk has a lead packet and contains a number of packets. In one embodiment, the lead packet is a PCR packet. Since the content of the PCR packet itself provides the temporal information for the playback unit, there is no additional storage overhead.

Processing logic then parses the lead packet of each chunk to extract temporal information of the lead packet (processing block 420). In one embodiment, the temporal information includes the chunk length and the release times for each lead packet in the partial transport stream. Processing logic uses the temporal information extracted to reconstruct the partial transport stream in order to allow the playback device to play out the packets in the partial transport stream (processing block 430).

FIG. 5 shows one embodiment of a process for dynamically choosing either timestamp-per-packet or timestamp-per-chunk to reconstruct a partial transport stream. The process is performed using processing logic that may comprise hardware (e.g., circuitry, dedicated logic, etc.), software (such as is run on a general purpose computer system or a dedicated machine), or a combination of both. Referring to FIG. 5, processing logic receives a signal (processing block 510). In response to the signal, processing logic determines whether it should perform timestamp-per-packet or timestamp-per-chunk (processing block 520).

If timestamp-per-packet is chosen, then processing logic receives a full transport stream (processing block 531). Processing logic time-stamps each packet in the full transport stream (processing block 532). Processing logic then filters the full transport stream (processing block 533). If a packet is not discarded during filtering, then processing logic stores the packet and its timestamp in an external storage medium (processing block 534). Processing logic later at playback time reads the stored packets and their timestamps from the external storage medium (processing block 535). Processing logic reconstructs a partial transport stream with the packets and timestamps read back (processing block 550).

Alternatively, processing logic receives an annotated partial transport stream from an external source (processing block 571). In one embodiment, the annotated partial transport stream includes a number of time-stamped packets. Then processing logic stores the time-stamped packets in the partial transport stream received in an external storage medium (processing block 534). At playback time, processing logic reads the stored packets and their timestamps from the external storage medium (processing block 535). Processing logic reconstructs the partial transport stream using the packets and their timestamps read back from the external storage medium (processing block 550).

If timestamp-per-chunk is chosen, then processing logic receives a full transport stream (processing block 541). Processing logic filters the full transport stream to generate a partial transport stream (processing block 542). Processing logic then store the packets left in the partial transport stream in an external storage medium (processing logic 543).

At playback time, processing logic reads the packets from the external storage medium (processing block 544). Processing logic parses the lead packet of each chunk of the partial transport stream to extract temporal information of the lead packet (processing logic 545). Processing logic reconstructs a piece-wise accurate partial transport stream with the packets and the temporal information extracted (processing block 550). Furthermore, processing logic can also receive a partial transport stream directly from an external source (e.g., Internet, etc.) (processing block 561). Processing logic stores the partial transport stream to an external storage medium (processing block 562).

At playback time, processing logic then reads the packets from the partial transport stream from the external storage medium (processing block 544). Processing logic then parses the lead packet of each chunk of the partial transport stream to extract temporal information of the lead packet (processing block 545). Processing logic reconstructs a partial transport stream with the packets and the temporal information extracted (processing logic 550).

In sum, processing logic dynamically chooses between timestamp-per-packet and timestamp-per-chunk in response to the signal. However, one should appreciate that the selection of either timestamp-per-packet or timestamp-per-chunk can be made during configuration of the system in an alternate embodiment.

FIG. 6A depicts a sample partial transport stream 620 generated by an embodiment of a process for reconstructing a partial transport stream using timestamp-per-packet, a sample partial transport stream 630 generated by an embodiment of a process for reconstructing a partial transport stream using timestamp-per-chunk, as well as the corresponding full transport stream 610. The lead packet of each chunk of the full transport stream 610 is precisely placed in both reconstructed partial transport streams 620, 630, shown as lead packets 621 and 631 respectively. In the partial transport stream 620, the remaining packets within a chunk are also precisely placed 622. But the remaining packets 632 in partial transport stream 630 are placed non-precisely. The lead packets 621 in partial transport stream 630 are precisely placed relative to each other. In one embodiment, the lead packet is a PCR packet. Typically, PCR packets are of the order of tens of milliseconds apart.

An embodiment of a process for reconstructing a partial transport stream using timestamp-per-packet can achieve total MPEG conformance, that is, every packet in the partial transport stream has jitter no worse than 500 ns. On the other hand, timestamp-per-chunk can only achieve MPEG conformance for the lead packets, e.g., the PCR packets in one embodiment, which is essential in matching the decoder and encoder rates. The latter could potentially cause overflow or underflow of decode buffers. However, by making the chunk size small enough and by choosing the lead packets including non-PCR packets with suitably interpolated start-times, such problems could be avoided in practice. An embodiment of a process for reconstructing a partial transport stream using timestamp-per-chunk is generally used when the partial transport data was pre-stored in certain systems and there was no opportunity to record arrival times of the packets before storing the packets.

The IEEE 1394 Packet Jitter Problem Versus Partial Transport Stream Reconstruction A packet jitter problem arises in the isochronous data-transfer mode in 1394 receiver devices while processing a MPEG transport stream. The isochronous mode, defined in the IEEE 1394 specification, is an attractive method of data transfer because it ensures guaranteed timing of data delivery, which is particularly necessary in applications such as video-on-demand, DVD movie players, and multi-channel audio data. To a 1394 receiver, the MPEG transport stream transferred over a 1394 bus looks like a stream of packets coming in at irregular intervals. The time dependency of each of the MPEG transport packets is very important. According to the MPEG specifications, the time jitter of each of these packets cannot exceed 500 ns for real-time display. The jitter problem is pictorially shown in FIG. 6B.

Figure 6B:
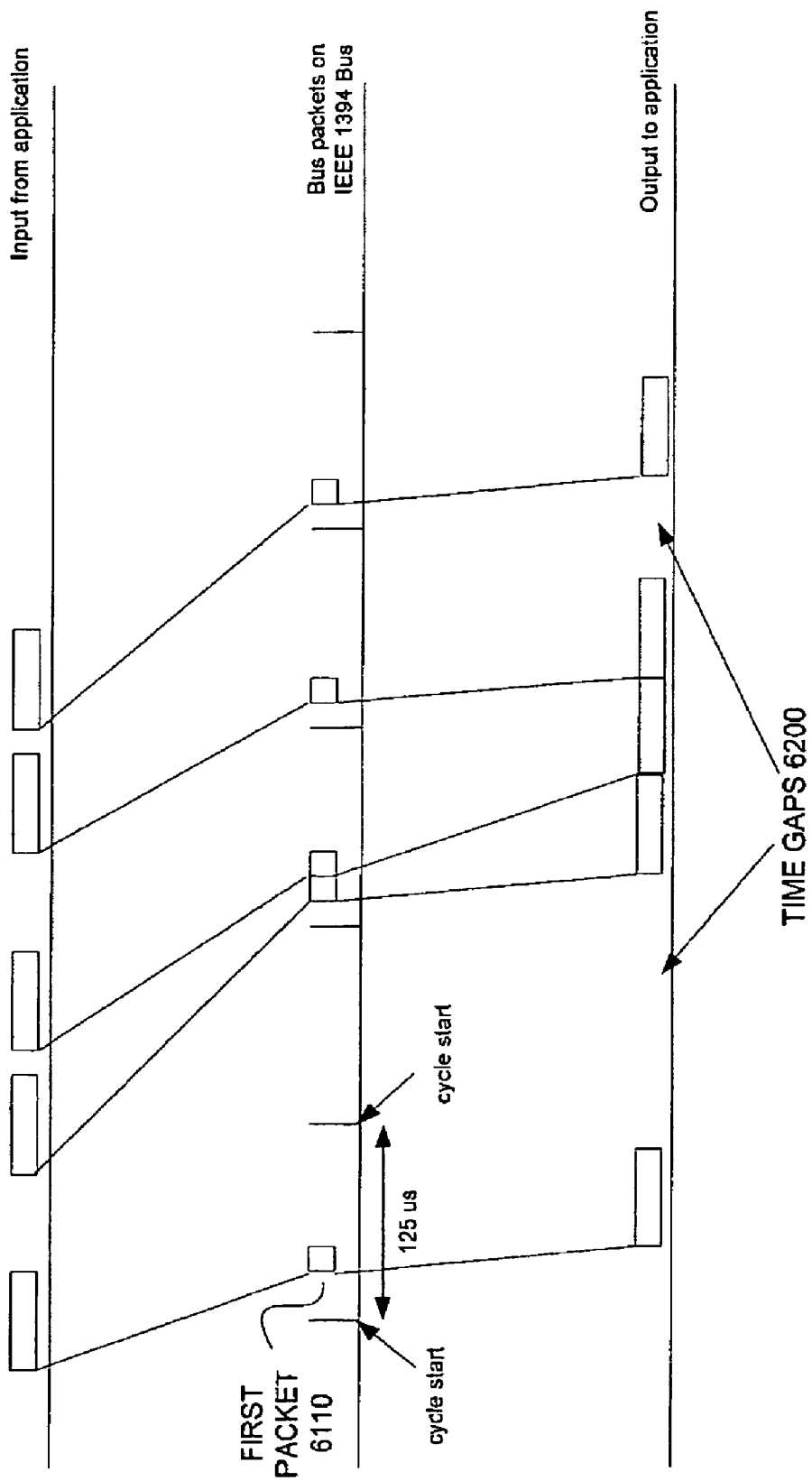
FIG. 6B shows an example of packet jitter in an IEEE 1394 device.

Referring to FIG. 6B, data is sent over an IEEE 1394 bus 6100 from the source device to the sink device. In general, the IEEE 1394 bus does not work in the same time domain as the source and sink devices. Isochronous data transfers in IEEE 1394 work in 125 microseconds cycle start boundaries. Referring to FIG. 6B, the first packet 6110 goes out on the bus when the next cycle start comes up. The next MPEG packet goes out when another cycle comes up and so on. Therefore, there are time gaps 6200 between the source packets sent out which introduce a lot of jitter in the stream. To alleviate this jitter problem, the International Organization for Standardization (ISO) defined the ISO 61883 protocol that includes a method of timestamping. When the MPEG packet stream is first received, the 1394 transmitter device timestamps these packets before sending the packets onto the bus. The timestamp is based on the 1394 cycle clock. After the timestamps are appended, the data is packetized and sent over the isochronous channel on the IEEE 1394 bus. The receiving 1394 device uses these timestamps to recreate the original stream. Hence, the source MPEG transport stream emerges with no induced jitter.

Traditional solutions to correct the jitter problem in the 1394 receiver device require packet first-in-first-out (FIFO) buffers, which typically store a small and fixed number of packets. Therefore the jitter-free transport stream emerging out of the receiver device is slightly delayed, with a fixed worst-case delay.

One embodiment of the method to reconstruct a partial transport stream (timestamp-per-packet) stores the packets in an external memory, as opposed to internal FIFO buffer for the 1394 jitter correction. In an alternate embodiment, a long-term storage device, such as a hard-drive, is used. Referring again to FIG. 3B, the exemplary embodiment of a system for performing a process to reconstruct a partial transport stream with timestamp-per-packet uses an external memory/storage 3300 to store packets. The external memory/storage 3300 includes a memory 3310 and a hard disk 3320 coupled to each other. This allows the partial transport stream to be recreated after an arbitrarily long delay.

An Embodiment of a Playback Unit

Figure 7:
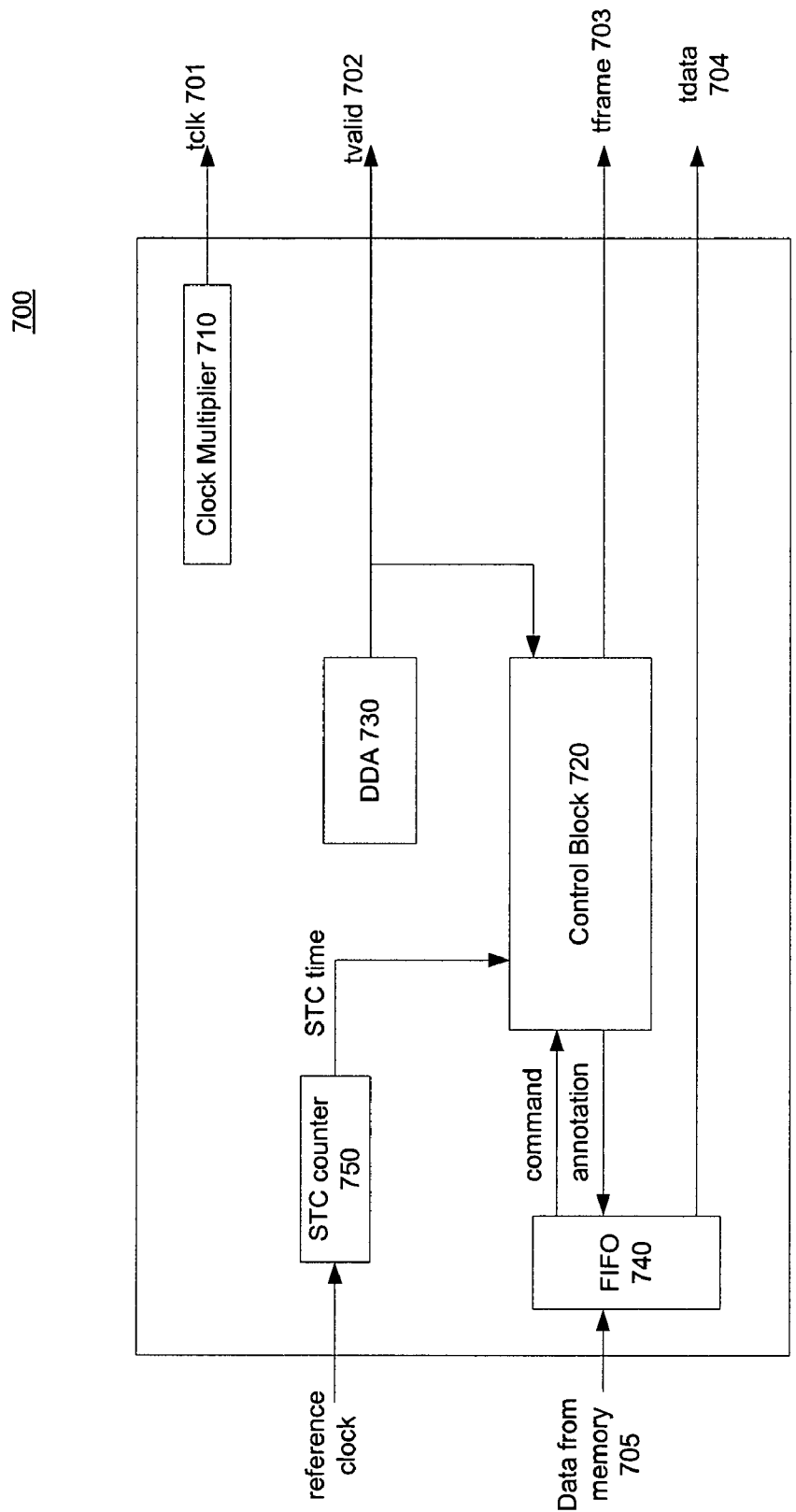
FIG. 7 shows an embodiment of a playback unit.

FIG. 7 shows an embodiment of a playback unit 700. The playback unit 700 reads transport data 705 from a memory buffer (not shown) and produces transport streams with prescribed data-rates very precisely. A transport stream interface contains a 1- or 8-bit data signal (tdata 704) with a transport clock (tclk 701), a valid signal (tvalid 702), and an optional packet-start signal (tframe 703). The playback unit 700 includes a clock multiplier 710, a digital differential analyzer (DDA) 730, a control block 720, a FIFO buffer 740, and an STC counter 750. The clock multiplier 710 generates a tclk 701 signal by multiplying the system clock with a programmable factor "x." The clock multiplier 710 is designed carefully to achieve precise clock multiplications even with odd numbers, i.e., the duty cycle of 50-50 is maintained for the output signal tclk 701. The DDA 730 generates a signal tvalid 702 with programmable factors "m" and "n." The DDA 730 de-asserts the tvalid 702 signal "m" out of every "m+n" cycles of tclk 701 on an average. In one embodiment, the DDA 730 employs a running average technique to match the rate very finely. The FIFO buffer 740 is byte-oriented and contains the transport data 705 read from a memory (not shown). In one embodiment, whenever the FIFO buffer 740 has more than half of its locations free, new data is read from the memory interface module (not shown) to fill up the FIFO buffer 740. The FIFO buffer 740 also contains logic to execute the commands issued by the control block 720.

The playback unit 700 includes a control block 720 to keep track of which bytes need to be read out or skipped from the FIFO buffer 740 and when the bytes need to be read out. The control block 720 contains counters used to generate the tframe 703 pulse at the beginning of a packet and issues relevant commands to the FIFO buffer 740. For the simple case of a full transport stream, the control block 720 requests the FIFO buffer 740 to "read byte" on every tvalid 702 pulse. However, the operation of the control block 720 is more complicated in the partial transport modes.

In the timestamp-per-packet mode, since the packets in a transport stream are annotated with timestamps at the beginning of every transport packet, the control block 720 uses the logic to read and interpret the annotations. In one embodiment of the playback unit 700, the control block 720 issues one of these two commands: "skip byte" or "read byte." The former is used for reading out the timestamps at the beginning of a packet. The current STC counter value plus a user-programmable STC counter offset are compared with the annotated timestamp to decide when the first byte of a packet is played out. Subsequently the remaining bytes of the packet are read out of the FIFO buffer 740 using a series of "read byte" commands on every tvalid 702 pulse.

In the timestamp-per-chunk mode, an external agent such as, for example, a microprocessor (not shown) programs the STC trigger value for the lead packet and the number of packets for every chunk. Since the chunk lengths are typically of the order of a few milliseconds, shadowed versions of every parameter in the playback unit 700 are required in one embodiment. This means that while the playback unit 700 is playing out a chunk of packets, the microprocessor can program parameters for the next chunk of packets. As soon as a full chunk of packets is played out, the playback unit 700 transfers the parameters from the shadow registers to the current working registers. The playback unit 700 also generates an interrupt to notify the microprocessor so that it can program the next set of parameters. This provides enough time for a microprocessor to program the relevant parameters, so there are no latency problems.

In one embodiment, control block 720 in this mode of operation issues only the "read byte" command because the data from the FIFO buffer 740 does not contain any auxiliary annotated data. In one embodiment, the control block 720 also contains a comparator that signals when the STC counter value crosses the programmed STC trigger value. This signal is used to send out the first byte of the lead packet in a chunk. In one embodiment, subsequently all the bytes of every packet in that chunk are played out by issuing an appropriate number of "read byte" commands to the FIFO buffer 740.

The playback unit 700 can recreate transport streams with very high precision. The following example illustrates achieving precision on the output transport stream by suitably choosing the values of the programmable factors "x", "m", and "n". For the purpose of illustration, consider the Advanced Television Systems Committee standard (ATSC) data-rate which is 19.39265846 Mbps and suppose the playback unit clock is 100 MHz, the factor "x" is 8 bits, and the factors "m" and "n" are 10 bits each. The output data rate is determined using the formula bitrate=(clock rate/x)*(m/(m+n))*8. With x=22, m=1009, and n=883, the playback unit 700 would generate a data-rate of 19.39265808 Mbps. At 30 frames/second, this implies that a video frame would only be dropped once every 472.5 hours or 20 days of operation.

Another feature of one embodiment of the playback unit 700 is the "one-shot" mode of operation. In this mode, the playback unit 700 reads out the transport stream at a prescribed rate and stops as soon as it reaches the end of the transport buffer. One set of scenarios where this mode is used is in so-called "pull"-mode applications, where the playback rate is governed by the rate of consumption of the transport stream. For example, if the transport stream produced by the playback unit 700 is being transferred across a network, or is being decoded and displayed at a non-realtime display rate (e.g., slow motion, fast forward, etc.), the output rate may be bursty rather than uniform. In these scenarios, the long-term playback rate is governed by the application consuming the data. In another set of scenarios, the playback unit 700 can be employed to generate multiple transport streams by running alternately on different transport buffers in the "one-shot" mode, essentially doing time-division multiplexing of different transport streams. This scenario is possible because the playback unit 700 can run an order-of-magnitude faster than what is required for a single transport stream. In this mode of operation, a microprocessor does long-term rate control, and alternately programs the playback unit 700 with different transport buffer parameters.

Figure 8:
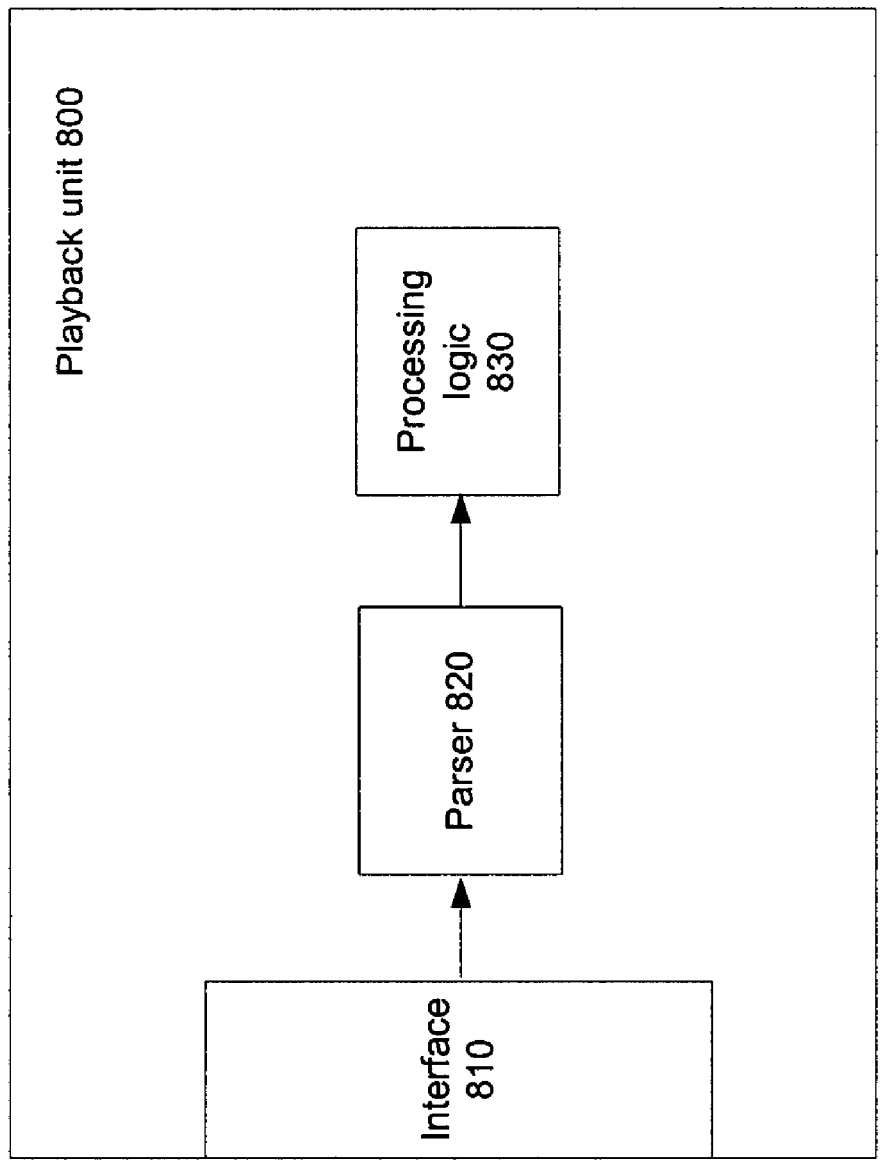
FIG. 8 shows an alternate embodiment of a playback unit.

FIG. 8 shows another embodiment of a playback unit 800. The components of the playback unit 800 can be implemented with hardware (e.g., circuitry, dedicated logic, etc.), software (such as is run on a general purpose computer system or a dedicated machine), or a combination of both. Referring to FIG. 8, the playback unit 800 includes an interface 810 to read chunks of a partial transport stream from an external storage medium (not shown). Each chunk includes a lead packet. In one embodiment, the lead packet is a PCR packet. The playback unit 800 further includes a parser 820 to parse the lead packet to extract the temporal information of the lead packet. Processing logic 830 reconstructs the partial transport stream with the temporal information and the chunks.

The foregoing discussion merely describes some exemplary embodiments of the present invention. One skilled in the art will readily recognize from such discussion, the accompanying drawings and the claims that various modifications can be made without departing from the spirit and scope of the appended claims. The description is thus to be regarded as illustrative instead of limiting.

What is claimed is:

1. A method comprising:
 time-stamping a lead packet in each of a plurality of chunks, each of the plurality of chunks comprising the lead packet and a plurality of packets, the lead packet comprising a program clock reference (PCR) packet and a chunk length of a chunk associated with the lead packet;
 storing the time-stamped chunks on a storage medium;
 reading back at playback time the stored chunks with their timestamps from the storage medium; and
 reconstructing a partial transport stream using the chunks and their timestamps read back, wherein the chunks are arranged in the partial transport stream in response to their timestamps.

2. The method of claim 1, further comprising:
 receiving a full transport stream; and
 filtering the full transport stream to generate the subset of time-stamped packets.

3. The method of claim 1, wherein the storage medium is an external memory.

4. The method of claim 3, wherein the external memory comprises a double data rate memory (DDR).

5. The method of claim 1, wherein time-stamping includes recording a value of a counter for the lead packet.

6. The method of claim 5, wherein the counter is a system time clock counter.

7. A method comprising:
 reading a plurality of chunks of a partial transport stream from a storage medium;
 parsing a lead packet of each of the plurality of chunks to extract the temporal information of the lead packet, wherein the temporal information includes the chunk length of the chunk associated with the lead packet; and
 reconstructing the partial transport stream using the extracted temporal information and the plurality of chunks, wherein the lead packet is placed in the partial transport stream in response to the temporal information.

8. The method of claim 7, wherein the storage medium is an external memory.

9. The method of claim 8, wherein the external memory comprises a double data rate memory (DDR).

10. The method of claim 7, wherein the lead packet is a program clock reference (PCR) packet.

11. The method of claim 7, wherein the temporal information includes the release time of the lead packet.

12. A method comprising:
 detecting a signal;
 dynamically selecting a first or a second modes in response to the signal, wherein the first mode includes
  time-stamping each of a plurality of packets,
  storing a subset of the time-stamped packets on a storage medium,
  reading at playback time the stored packets from the storage medium, and
  reconstructing a first partial transport stream using the timestamps of the plurality of packets, wherein the plurality of packets are arranged in the first partial transport stream in response to the timestamps; and
 wherein the second mode includes
  reading a plurality of chunks of a second partial transport stream from the storage medium,
  parsing a lead packet of each of the plurality of chunks to extract the temporal information of the lead packet within the second partial transport stream, wherein the temporal information includes the chunk length of the chunk associated with the lead packet, and
  reconstructing the second partial transport stream using the extracted temporal information and the plurality of chunks, wherein the lead packet is placed in the second partial transport stream in response to the temporal information.

13. The method of claim 12, wherein the storage medium is an external memory.

14. The method of claim 13, wherein the external memory includes a double data rate memory (DDR).

15. A method comprising:
 receiving an annotated partial transport stream from an external source;
 storing a plurality of time-stamped chunks from the partial transport stream on a storage medium;
 reading back at playback time the stored time-stamped chunks from the storage medium; and
 reconstructing the partial transport stream using temporal information extracted from the plurality of time-stamped chunks, the plurality of time-stamped chunks being arranged in response to their timestamps, said temporal information including chunk lengths of the plurality of time-stamped chunks.

16. The method of claim 15, wherein the storage medium is an external memory.

17. The method of claim 16, wherein the external memory includes a double data rate memory (DDR).

18. A system comprising:
 a storage medium;
 a transport processor coupled to the storage medium, wherein the transport processor time-stamps each of a plurality of chunks received and to store the plurality of chunks on the storage medium; and
 a playback device coupled to the storage medium, wherein the playback device reads back the stored chunks from the storage medium and to reconstruct at playback time a partial transport stream with the chunks read back, a chunk length extracted from a lead packet of each of the plurality of chunks, and the timestamps of the chunks read back.

19. The system of claim 18, wherein the storage medium includes an external memory.

20. The system of claim 19, wherein the external memory includes a double data rate memory (DDR).

21. The system of claim 18, wherein the transport processor comprises a filter to turn an incoming full transport stream into a partial transport stream, the partial transport stream includes the one or more of the plurality of packets.

22. The system of claim 21, wherein the transport processor further comprises a system time clock (STC) counter to record the time when each of the plurality of packets is received.

23. A system comprising:
a storage medium; and
a playback device coupled to the storage medium, the playback device including
an interface to read a plurality of chunks of a partial transport stream from the storage medium, each of the plurality of chunks including a lead packet,
a parser to parse the lead packet to extract temporal information of the partial transport stream, wherein the temporal information includes the chunk length of the chunk associated with the lead packet, and
a processing logic module to reconstruct the partial transport stream with the temporal information and the plurality of chunks.

24. The system of claim 23, wherein the storage medium includes an external memory.

25. The system of claim 24, wherein the external memory includes a double data rate memory (DDR).

26. The system of claim 23, wherein the lead packet is a program clock reference (PCR) packet.

27. The system of claim 23, wherein the temporal information includes the release time of the lead packet of each of the plurality of chunks.

28. A system comprising:
a storage medium;
a playback device coupled to the memory;
a processor coupled to the storage medium, wherein the processor receives a signal and to dynamically select a first mode or a second mode in response to the signal, wherein the first mode comprises
time-stamping each of a plurality of packets,
storing a subset of the time-stamped packets on the storage medium,
reading at playback time the stored packets from the storage medium, and
reconstructing a first partial transport stream with the packets read; and
wherein the second mode comprises
reading a plurality of chunks of a second partial transport stream from the storage medium, each of the plurality of chunks including a lead packet,
parsing a lead packet of each of the plurality of chunks to extract the temporal information of the lead packet in the second partial transport stream, wherein the temporal information includes the chunk length of the chunk associated with the lead packet, and
reconstructing the second partial transport stream with the temporal information of the lead packets and the plurality of chunks.

29. The system of claim 28, wherein the storage medium includes an external memory.

30. The system of claim 29, wherein the external memory includes a double data rate memory (DDR).

31. The system of claim 29, wherein the external memory includes a hard disk.

32. A method comprising:
in response to a signal, dynamically selecting a timestamp-per-packet mode or a timestamp-per-chunk mode to reconstruct a video stream, and
if the timestamp-per-chunk mode is selected,
reading a plurality of chunks from a storage device, each of the plurality of chunks comprising a lead packet and a plurality of packets;
parsing a lead packet of each of the plurality of chunks to extract temporal information and a chunk length of a respective chunk from the lead packet; and
reconstructing the video stream using the plurality of chunks, the temporal information, and the chunk length.

33. The method of claim 32, wherein reconstructing the video stream comprises:
placing the lead packet in the video stream according to the temporal information.

34. The method of claim 32, wherein the lead packet is a program clock reference (PCR) packet.

35. A system comprising:
a storage medium;
a processor coupled to the storage medium, wherein the processor dynamically selects a timestamp-per-packet mode or a timestamp-per-chunk mode to reconstruct a video stream, wherein, if the timestamp-per-chunk mode is selected, the processor retrieves a plurality of chunks from the storage device, each of the plurality of chunks including a lead packet and a plurality of packets, the processor further parses the lead packet of each of the plurality of chunks to extract temporal information and a chunk length of a respective chunk, and to reconstruct a video stream using the plurality of chunks, the temporal information, and the chunk length.

36. The system of claim 25, further comprising:
a playback device coupled to the processor to play the video stream reconstructed.

37. The system of claim 28, wherein the storage medium includes an external memory.

38. The system of claim 29, wherein the external memory includes a doable data rate memory (DDR).

* * * * *

UNITED STATES PATENT AND TRADEMARK OFFICE
CERTIFICATE OF CORRECTION

PATENT NO. : 7,372,873 B1  Page 1 of 1
APPLICATION NO. : 10/608310
DATED : May 13, 2008
INVENTOR(S) : Kumar et al.

It is certified that error appears in the above-identified patent and that said Letters Patent is hereby corrected as shown below:

On Sheet 6 of 10, Reference Numeral 561, Fig. 5, line 1, delete "Receve" and insert -- Receive --, therefor.

In column 1, line 63, after "information" insert -- . --.

In column 13, line 56, in Claim 7, after "extract" delete "the".

In column 16, line 47, in Claim 36, delete "claim 25," and insert -- claim 35, --, therefor.

In column 16, line 54, in Claim 38, delete "doable" and insert -- double --, therefor.

Signed and Sealed this

Nineteenth Day of August, 2008

JON W. DUDAS
*Director of the United States Patent and Trademark Office*